US007965318B2

(12) United States Patent
Huang

(10) Patent No.: US 7,965,318 B2
(45) Date of Patent: Jun. 21, 2011

(54) IMAGE DETECTING MODULE

(75) Inventor: Yaw-Ching Huang, Taichung (TW)

(73) Assignee: Asia Optical Co., Inc., Taichung (TW)

( * ) Notice: Subject to any disclaimer, the term of this patent is extended or adjusted under 35 U.S.C. 154(b) by 460 days.

(21) Appl. No.: 12/244,081

(22) Filed: Oct. 2, 2008

(65) Prior Publication Data

US 2009/0316011 A1 Dec. 24, 2009

(30) Foreign Application Priority Data

Jun. 18, 2008 (TW) .............................. 97122664 A

(51) Int. Cl.
*H04N 5/228* (2006.01)
*G03B 17/00* (2006.01)
(52) U.S. Cl. ............... 348/208.7; 348/208.2; 348/208.4; 396/52
(58) Field of Classification Search ............... 348/208.7, 348/208.2, 208.4, 208.11, 308; 396/52, 54, 396/55, 439, 144, 374, 428, 79, 466, 462, 72, 349, 73; 359/823, 827, 828, 111
See application file for complete search history.

(56) References Cited

U.S. PATENT DOCUMENTS 5,266,988 A * 11/1993 Washisu .......................... 396/55
7,742,692 B2 * 6/2010 Omi .................................. 396/55
* cited by examiner

*Primary Examiner* — Nicholas G Giles
*Assistant Examiner* — Stephen Coleman
(74) *Attorney, Agent, or Firm* — Thomas|Kayden

(57) ABSTRACT

The invention provides an image detecting module including a base, a carrier movably disposed on the base, an image detecting unit disposed on the carrier, a contact portion fixed to the carrier, and a fixed member fixed to the base. The fixed member has a protrusion movably contacting a recess of the contact portion. When an external force is exerted on the base and the carrier moves with respect to the base, the protrusion slides on a surface of the recess. When the external force is released, the protrusion slides to the bottom of the recess, such that the carrier is held in a predetermined position with respect to the base.

20 Claims, 5 Drawing Sheets

IMAGE DETECTING MODULE

CROSS REFERENCE TO RELATED APPLICATIONS

This Application claims priority of Taiwan Patent Application No. 097122664, filed on Jun. 18, 2008, the entirety of which is incorporated by reference herein.

BACKGROUND OF THE INVENTION

1. Field of the Invention

The invention relates in general to an image detecting module and in particular to an image detecting module of a camera.

2. Description of the Related Art

Referring to FIG. 1, U.S. Pat. No. 5,266,988 discloses an image shake suppressing device for a camera. The image shake suppressing device is mounted in a lens 32. When using the camera, the angular velocity meters 33p and 33y measure the angular velocity of the moving camera and provide the measured data to a circuit. The driving parts 37p and 37y impel the lens 32 along a vertical optical axis, thereby compensating or suppressing blur due to vibration of the camera. When the image shake suppressing device is not in use, power is still supplied to the driving parts 37p and 37y, and this may result in considerable power consumption.

BRIEF SUMMARY OF INVENTION

The invention provides an image detecting module including a base, a carrier movably disposed on the base, an image detecting unit disposed on the carrier, a contact portion fixed to the carrier, and a fixed member fixed to the base. The fixed member has a protrusion movably contacting a recess of the contact portion. When an external force is exerted on the base and the carrier moves with respect to the base, the protrusion slides on a surface of the recess. When the external force is released, the protrusion slides to the bottom of the recess, such that the carrier is held in a predetermined position with respect to the base.

BRIEF DESCRIPTION OF DRAWINGS

The invention can be more fully understood by reading the subsequent detailed description and examples with references made to the accompanying drawings, wherein.

DETAILED DESCRIPTION OF INVENTION

Figure 1:
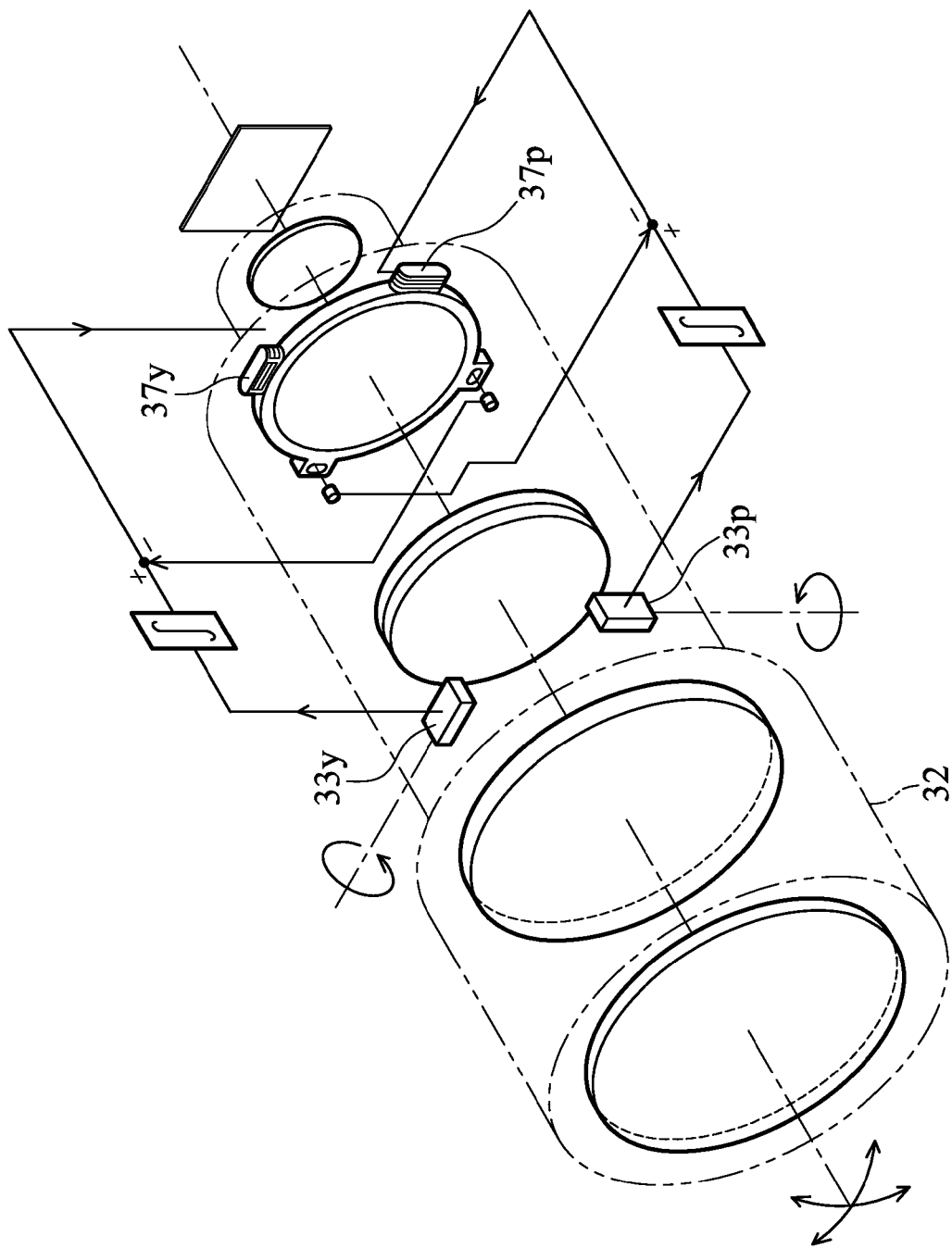
FIG. 1 is a perspective diagram of a conventional image shake suppressing device for a camera.
Figure 2:
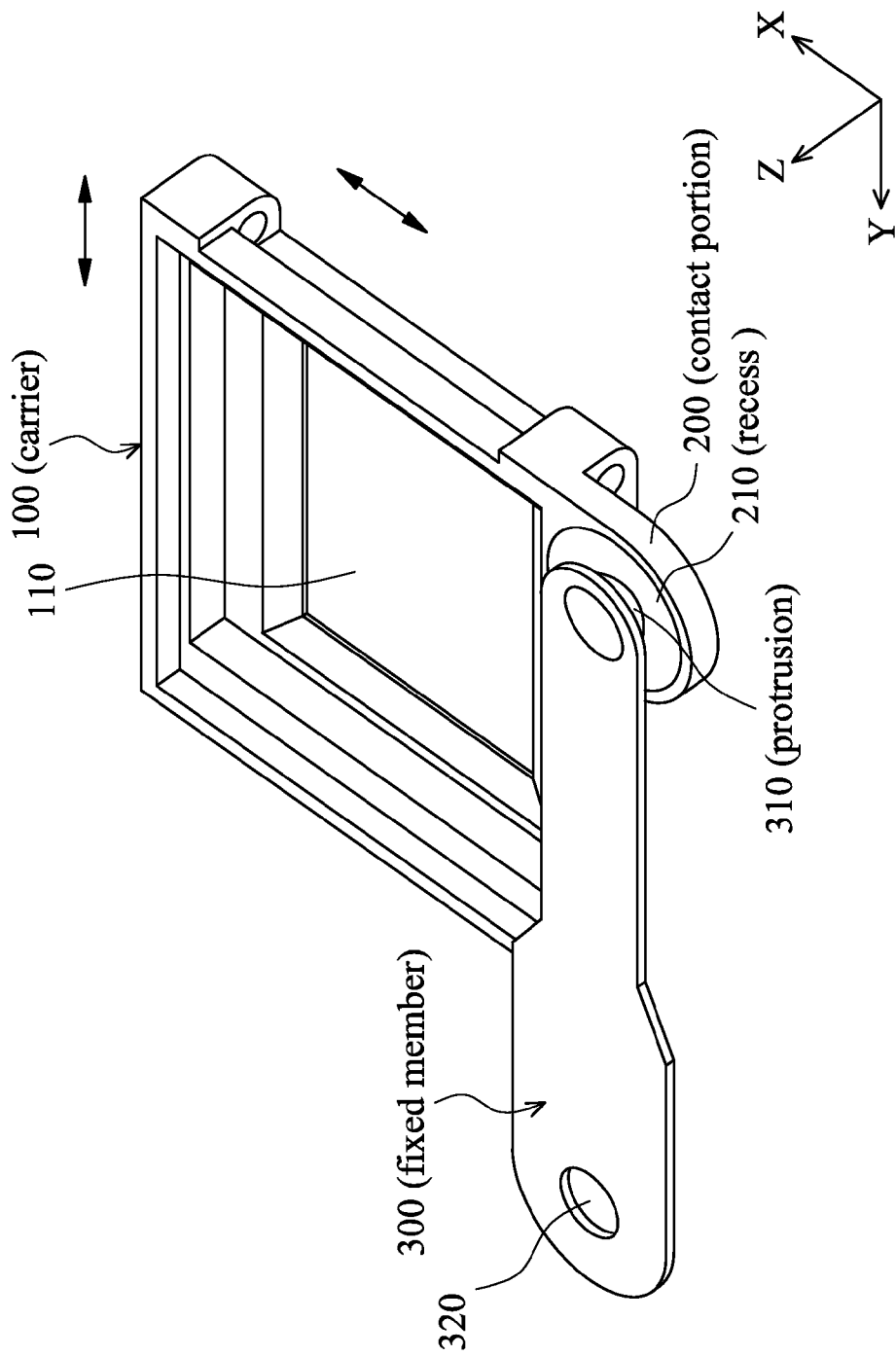
FIG. 2 is a perspective diagram of an image detecting module according to an embodiment of the invention.
Figure 3:
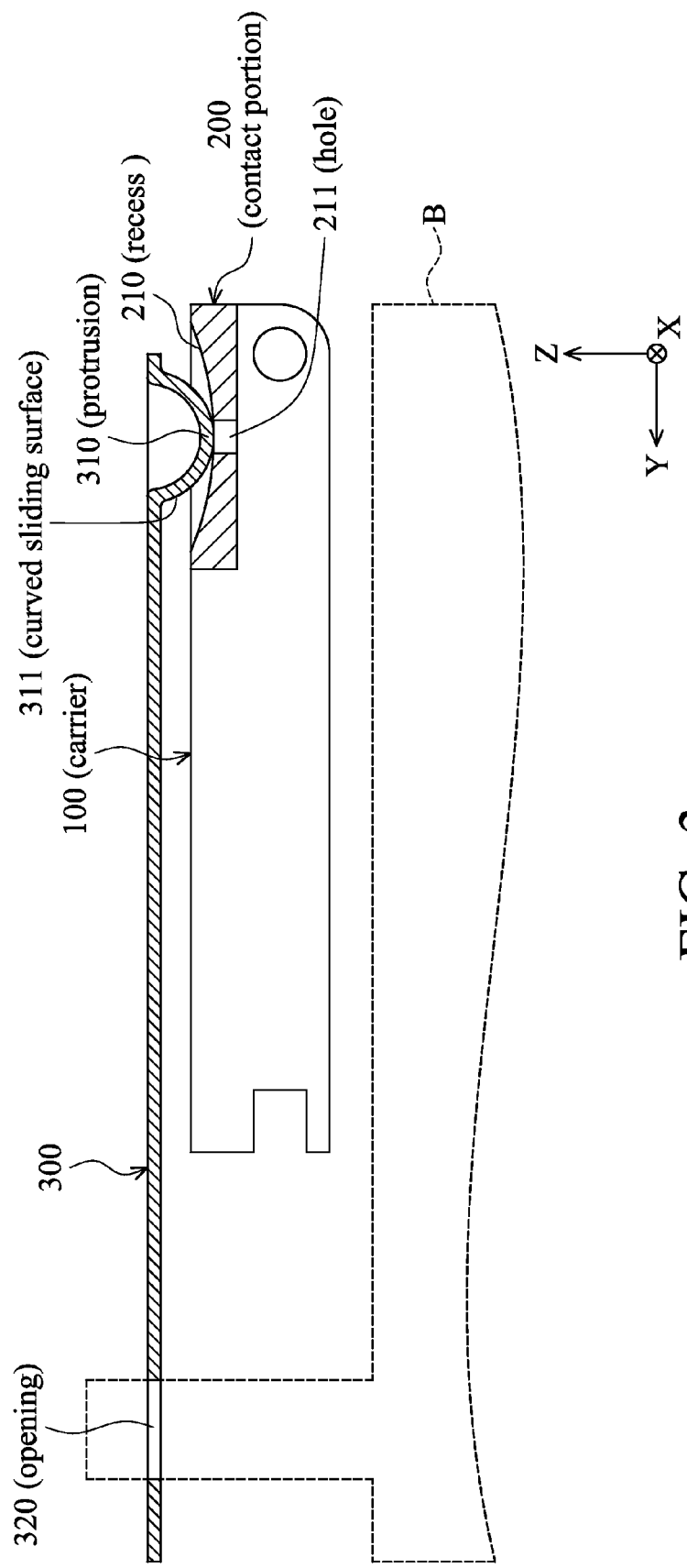
FIG. 3 is a sectional view of the image detecting module in FIG. 2.

Referring to FIGS. 2 and 3, an embodiment of an image detecting module is disposed in a camera, comprising a rectangular carrier 100, a contact portion 200, a fixed member 300, a base B, and an image detecting unit (not shown) received in a space 110 of the carrier 100. As depicted in FIGS. 2 and 3, the rectangular carrier 100 is disposed on the base B and movable with respect to the base B in a first direction (along X or Y axis). In this embodiment, the image detecting unit is a charge-coupled device (CCD) for capturing images. The fixed member 300 is longitudinal and flexible, wherein the base B is joined to an opening 320 of the fixed member 300, as shown in FIG. 3.

The carrier 100 in FIG. 2 is substantially parallel to the XY plane, and the contact portion 200 is fixed to a side of the carrier 100. As shown in FIG. 3, the contact portion 200 comprises a recess 210 having a curved surface with a hole 211 formed at the bottom thereof. The fixed member 300 comprises a protrusion 310 at an end thereof. The protrusion 310 has a curved sliding surface 311 in frictional contact with the surface of the recess 210.

When the camera is not in use or in a stationary state, the protrusion 310 is stably positioned in the hole 211 at the bottom of the recess 310, and the carrier 100 is held in a predetermined position with respect to the base B. When the camera is moved by an external force during usage, the base B and the fixed member 300 moves relative to the carrier 100, such that the protrusion 310 releases from the hole 211 and slides along the curved surface of the recess 210. Since the carrier 100 and the image detecting unit are not moved with the fixed member 300 and the base B of the camera, image blur caused by hand shake or movement of the photographer can be compensated for or suppressed. When the external force is released and the camera is at a stationary state, the protrusion 310 spontaneously slides downward to the bottom of the recess 210, such that the carrier 100 and the image detecting unit return to the predetermined position with respect to the base B, as shown in FIG. 3.

In this embodiment, vibration of the camera is absorbed by frictional sliding between the protrusion 310 and the recess 210. The protrusion 310 has a curved sliding surface 311 movably contacting the surface of the recess 210, to facilitate sliding therebetween and compensate image blur caused by hand shake or movement of the photographer.

Figure 4:
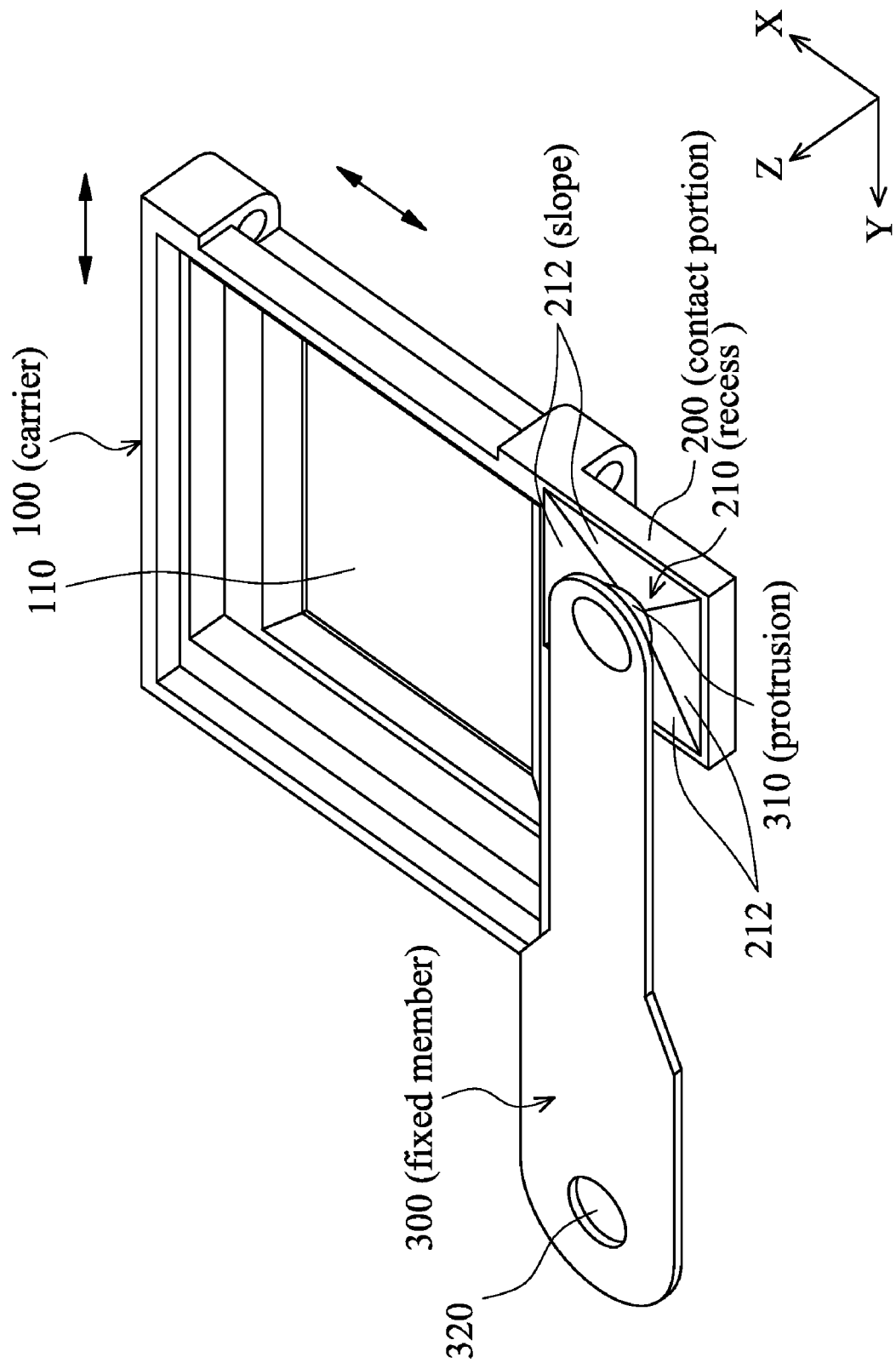
FIG. 4 is a perspective diagram of an image detecting module according to another embodiment of the invention.
Figure 5:
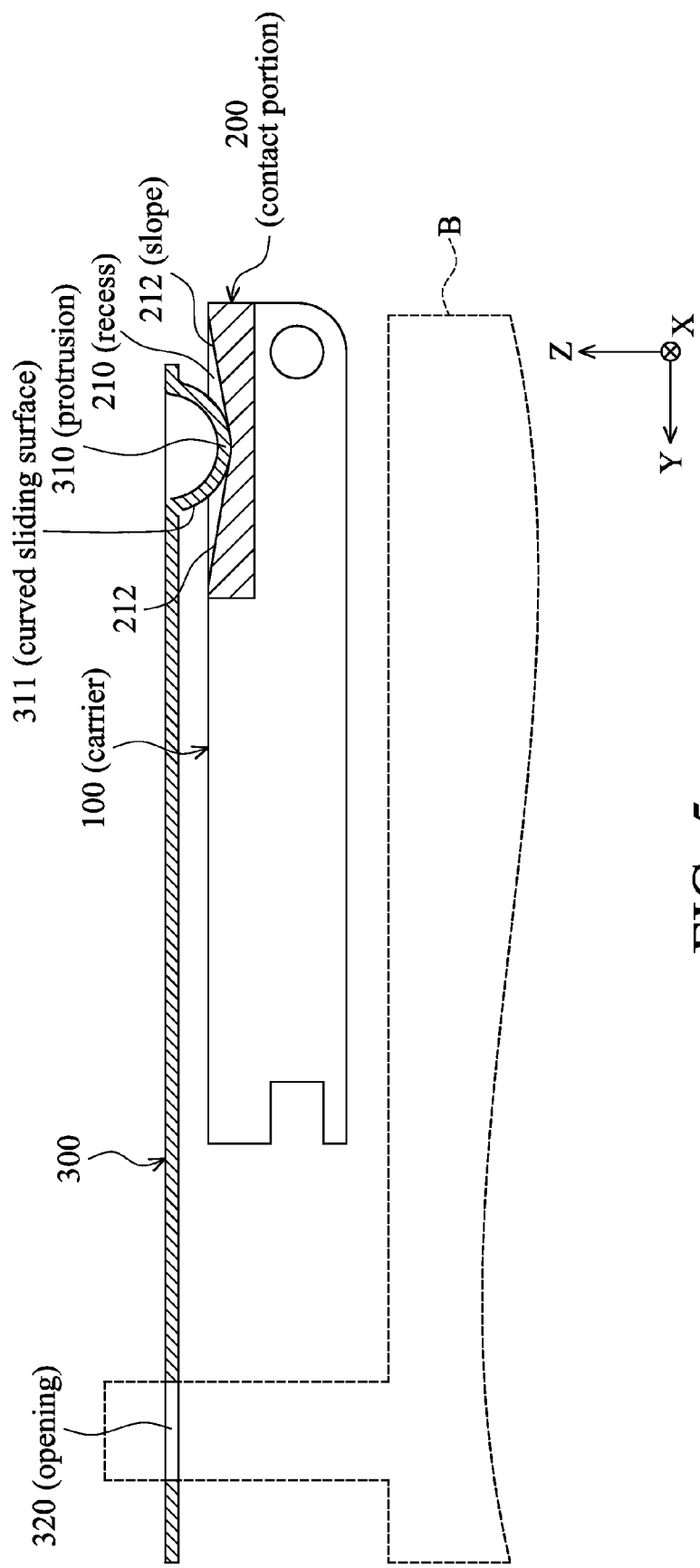
FIG. 5 is a sectional view of the image detecting module in FIG. 4.

Referring to FIGS. 4 and 5, another embodiment of the contact portion 200 comprises a recess 210 including four symmetrical triangular slopes 212, wherein the four symmetrical slopes 212 define an inverted pyramidal space. When the camera is not in use or at a stationary state, the protrusion 310 is stably positioned at the bottom of the recess 210, as shown in FIG. 5, and the carrier 100 is held in a predetermined position with respect to the base B. When the camera is moved by an external force during usage, the base B and the fixed member 300 moves relative to the carrier 100, such that the protrusion 310 releases from the hole 310 and slides along the slope 212 of the recess 210. Since the carrier 100 and the image detecting unit are not moved with the fixed member 300 and the base B, image blur caused by hand shake or movement of the photographer can be compensated for or suppressed. When the external force is released and the camera is at a stationary position, the protrusion 310 spontaneously slides downward to the bottom of the recess 210, such that the carrier 100 and the image detecting unit return to the predetermined position with respect to the base B.

In some embodiments, positions of the recess 210 and the protrusion 310 can be exchanged. Namely, the recess 210 may be disposed at an end of the fixed member 300, and the protrusion 310 may be formed on the contact portion 200, corresponding to the recess 210. Furthermore, the recess 210 and the contact portion 200 may be integrally formed with the carrier 100, and the protrusion 310 may be integrally formed with the fixed member 300, to enhance structural strength and save assembly cost thereof.

The invention provides an image detecting module disposed in a camera. The image detecting module comprises a carrier and a base movable with respect to each other by a protrusion sliding on a surface of a recess, so as to compensate or suppress image blur caused by hand shake. As the invention does not need any vibration sensor, computing circuit, driving element or feedback control system, power consumption and production cost are reduced.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation to encompass all such modifications and similar arrangements.

What is claimed is:

1. An image detecting module, comprising:
   a base,
   a carrier movably disposed on the base and substantially parallel to a plane;
   a contact portion fixed to a side of the carrier, comprising a recess;
   an image detecting unit disposed on the carrier; and
   a fixed member fixed to the base, comprising a protrusion movably contacting the recess, wherein when an external force is exerted on the base and the carrier moves with respect to the base in a first direction, the protrusion slides on a surface of the recess, and when the external force is released, the protrusion slides to the bottom of the recess, such that the carrier is held in a predetermined position with respect to the base.

2. The image detecting module as claimed in claim 1, wherein the first direction is substantially parallel to the plane.

3. The image detecting module as claimed in claim 1, wherein the surface of the recess is curved with the protrusion sliding thereon when the carrier moves with respect to the base.

4. The image detecting module as claimed in claim 3, wherein the contact portion further comprises a hole at the bottom of the recess.

5. The image detecting module as claimed in claim 1, wherein the recess comprises a plurality of slopes defining a pyramidal space, and the protrusion slides on the slopes when the carrier moves with respect to the base.

6. The image detecting module as claimed in claim 1, wherein the recess comprises four symmetrical slopes defining a pyramidal space, and the protrusion slides on the slopes when the carrier moves with respect to the base.

7. The image detecting module as claimed in claim 1, wherein the protrusion comprises a curved sliding surface sliding on the surface of the recess when the carrier moves with respect to the base.

8. The image detecting module as claimed in claim 1, wherein the fixed member is longitudinal with the protrusion formed at an end thereof.

9. The image detecting module as claimed in claim 1, wherein the recess is integrally formed with the contact portion in one piece.

10. The image detecting module as claimed in claim 1, wherein the protrusion is integrally formed with the fixed member in one piece.

11. An image detecting module, comprising:
    a base,
    a carrier movably disposed on the base and substantially parallel to a plane;
    a contact portion fixed to a side of the carrier, comprising a protrusion;
    an image detecting unit disposed on the carrier; and
    a fixed member fixed to the base, comprising a recess movably contacting the protrusion, wherein when an external force is exerted on the base and the carrier moves with respect to the base in a first direction, the protrusion slides on a surface of the recess, and when the external force is released, the protrusion slides to the bottom of the recess, such that the carrier is held in a predetermined position with respect to the base.

12. The image detecting module as claimed in claim 11, wherein the first direction is substantially parallel to the plane.

13. The image detecting module as claimed in claim 11, wherein the surface is curved with the protrusion sliding thereon when the carrier moves with respect to the base.

14. The image detecting module as claimed in claim 13, wherein the contact portion further comprises a hole at the bottom of the recess.

15. The image detecting module as claimed in claim 11, wherein the recess comprises a plurality of slopes defining a pyramidal space, and the protrusion slides on the slopes when the carrier moves with respect to the base.

16. The image detecting module as claimed in claim 11, wherein the recess comprises four symmetrical slopes defining a pyramidal space, and the protrusion slides on the slopes when the carrier moves with respect to the base.

17. The image detecting module as claimed in claim 11, wherein the protrusion comprises a curved sliding surface sliding on the surface of the recess when the carrier moves with respect to the base.

18. The image detecting module as claimed in claim 11, wherein the fixed member is longitudinal with the protrusion formed at an end thereof.

19. The image detecting module as claimed in claim 11, wherein the protrusion is integrally formed with the contact portion in one piece.

20. The image detecting module as claimed in claim 11, wherein the recess is integrally formed with the fixed member in one piece.

* * * * *